United States Patent [19]
Whitaker et al.

[11] 3,904,276
[45] Sept. 9, 1975

[54] OPTICAL COMPONENTS

[75] Inventors: Raymond Whitaker; Dennis William Barker, both of Leeds, England

[73] Assignee: The Rank Organisation Limited, London, England

[22] Filed: Dec. 13, 1973

[21] Appl. No.: 424,324

[30] Foreign Application Priority Data
Dec. 13, 1972 United Kingdom............. 57377/72

[52] U.S. Cl............................... 350/252; 350/253
[51] Int. Cl.²......................................... G02b 7/02
[58] Field of Search.......................... 350/245–257, 350/65–67, 287

[56] References Cited
UNITED STATES PATENTS

| 870,535 | 11/1907 | Bausch | 350/253 |
| 2,377,718 | 6/1945 | Ress | 350/252 |
| 3,205,774 | 9/1965 | Estes | 350/253 |
| 3,351,408 | 11/1967 | Krewalk | 350/252 |
| 3,671,108 | 6/1972 | Kilgus | 350/253 |

Primary Examiner—Alfred E. Smith
Assistant Examiner—Michael J. Tokar
Attorney, Agent, or Firm—Brisebois & Kruger

[57] ABSTRACT

This invention provides an improved mounting or clamping device for optical components such as lenses in which a clamping ring which clamps a component against a shoulder in a mounting body has a deformable resilient lip which bears against the component and which accommodates thermal expansion and contraction in the mounting body, avoiding strain in the optical component. The clamping ring may have a single annular deformable lip or a number of circumferentially regularly spaced apart lips.

7 Claims, 5 Drawing Figures

OPTICAL COMPONENTS

This invention relates to mounting devices for optical elements, and is particularly, but not exclusively, applicable to the mounting of lens elements in a lens assembly.

The usual type of mounting device used for optical elements such as lenses consists of a tubular metal body in which the elements are assembled and clamped by a screw-threaded clamping ring. The effects of thermal expansion and contraction when such a mounting device is subject to environmental temperature changes inevitably cause a change in the stress on the optical element, manifested either as a slackening of the clamping load on the element, possibly resulting in a looseness of the element in its mounting, or an an undesirable strain in the glass of the optical element or elements.

An object of the present invention is to provide an improved mounting device for an optical element by means of which an element can be held securely clamped, without being subjected to undesirably severe strain, despite changes in ambient temperature within a given range.

According to the invention there is provided a mounting device for an optical component, comprising a hollow body having an internal shoulder against which an optical component bears in use of the device, and an annular clamping element in screw-threaded engagement with the body, the clamping element having at least one radially inwardly projecting deformable resilient lip which, upon assembly of an optical component in the device, bears against a surface of the optical component to exert a clamping force against the said internal shoulder of the body.

The internal shoulder of the mounting device is preferably annular and bears against a circumferentially continuous region of the optical component in use of the device.

In a preferred embodiment of the invention the clamping element has a single annular inwardly projecting deformable lip which upon assembly of the device exerts a circumferentially uniformly distributed clamping force on the optical component. The annular lip may, in addition, be provided with a number of circumferentially evenly distributed axially deformed portions which engage a said optical component at regularly spaced-apart circumferential intervals in use of the device.

In an alternative embodiment of the invention the clamping element has a number of circumferentially evenly distributed radially inwardly projecting deformable lips arranged around its internal periphery to engage a said optical component at a number of evenly spaced apart positions.

The deformable lip may in some embodiments of the invention overlie a rigid substantially non-deformable part of the clamping element so that the lip is normally spaced from the non-deformable part by a gap which is closed when the clamping element is tightened on the body. Thermal expansion of the body when the latter is subjected to a temperature increase merely causes the gap to reappear, while the natural resilience of the lip causes it to maintain a clamping force on the optical component.

The or each deformable lip is preferably formed integrally with the clamping element.

The invention will now be more particularly described, merely by way of example, with reference to the accompanying purely diagrammatic drawings, in which.

Figure 1:
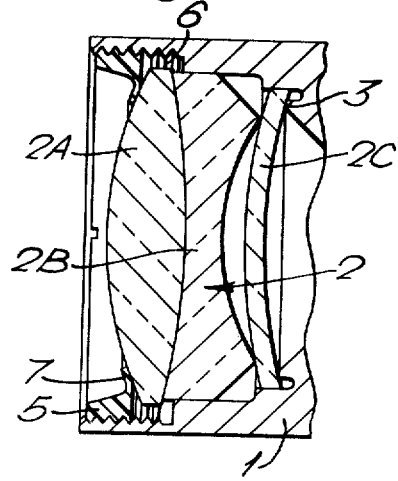
FIG. 1 is a partial longitudinal cross section through a lens mounting device according to a first embodiment of the invention.

Referring to the drawings, the mounting device shown in FIG. 1 is typical of the type of mounting used for lens assemblies. The improved mounting device illustrated in the drawings is intended for use in environments which are subject to temperature changes, for example where the lens assembly is used in an electrostatic copier.

The mounting device has a tubular hollow body 1 in which a number of lens elements or other optical components are mounted in predetermined fixed relationship. FIG. 1 illustrates part of the mounting device housing an optical component 2 comprising three lens elements 2A, 2B, 2C. The optical component 2 bears against an internal annular shoulder 3 formed within the tubular body 1 and is retained against this shoulder by a clamping ring 5 which is in screw-threaded engagement with an internally threaded end portion 6 of the tubular body 1.

Both the tubular body 1 and the clamping ring 5 are fabricated in metal, and to ameliorate the effects of thermal expansion and contraction of the body 1 on the clamping force exerted on the optical component 2 the clamping ring 5 is provided with an annular radially inwardly projecting deformable resilient lip 7 which bears against the optical component 2 and exerts a clamping force thereon which is reacted against the annular shoulder 3 of the body 1. The natural resilience of the annular lip 7 ensures that a clamping force is maintained on the optical component 3 in the event of thermal expansion of the body 1 when the latter is subjected to a temperature rise, at least within the limits of temperature to which the assembly is subjected in use. Similarly, in the event of thermal contraction of the tubular body 1, the annular lip 7 deforms so as to avoid causing undesirable strain in the glass of the optical component 2.

By means of the simple artifice of the deformable clamping lip 7 the improved mounting device according to the invention can be used in a wide range of environmental temperatures without adverse effect on the rigidity of the mounting of the optical component 2.

Figure 2:
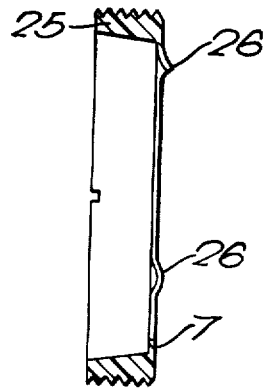
FIG. 2 is a longitudinal section of an alternative clamping element for use in the embodiment of FIG. 1.

FIG. 2 illustrates an alternative form of clamping ring 25 for use in a mounting device of the kind shown in FIG. 1. The clamping ring 25 is essentially similar to the clamping ring 5 shown in FIG. 1, except that the annular lip 7 is provided with a number of circumferentially evenly distributed axially deformed portions 26 formed by making slight indentations in the lip 7. In the example of FIG. 2 there are three such axially deformed portions 26 which provide a three-point bearing for the optical component 2 in use of the clamping ring 25, minimising alignment error in the mounting of the optical component due to machining errors of the metal components.

Figure 3:
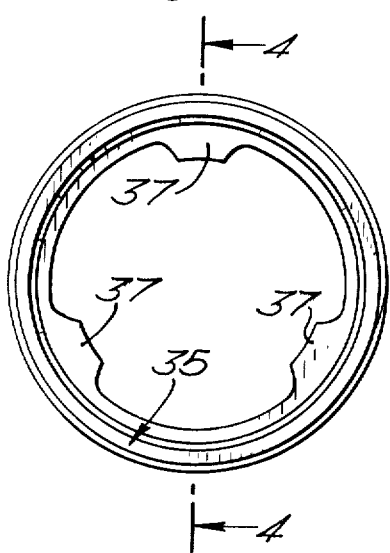
FIG. 3 is a plan view of another alternative clamping element for use in the embodiment of FIG. 1.
Figure 4:
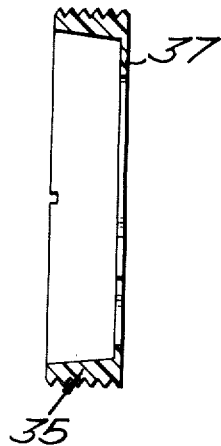
FIG. 4 is a longitudinal section of the clamping element shown in FIG. 3, taken on line 4—4 of FIG. 3

FIGS. 3 and 4 illustrate a further alternative type of locking ring 35 which may be employed in place of the locking ring 5 shown in FIG. 1. In the embodiment of FIGS. 3 and 4 the locking ring 35 has a number of (in this example three) circumferentially evenly distributed radially inwardly projecting deformable lips 37 in place of the single annular lip 7 of FIG. 1. The three lips 37 may conveniently be formed by cutting equal portions from the single annular lip 7 of the clamping ring 5 of FIG. 1. The clamping ring 35 provides a kinematic three-point clamp permitting correction of alignment error in the mounting of the optical component.

Figure 5:
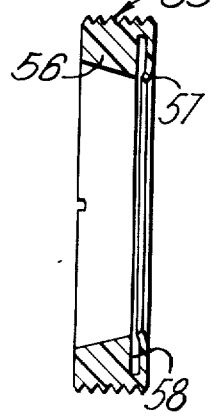
FIG. 5 is a longitudinal section, corresponding to FIGS. 2 and 4, of a yet further alternative clamping element for use in the mounting device shown in FIG. 1.

A further alternative form of clamping ring 55 is illustrated in FIG. 5 and comprises a rigid annular substantially non-deformable part 56 and an annular radially inwardly projecting deformable lip 57 formed integrally with the part 56 and spaced from a flat annular shoulder 58 of the latter by a narrow annular gap 59. When the clamping ring 55 is screwed home upon assembly of an optical component in the mounting device the lip 57 is deformed until it makes contact with the flat shoulder 58, when a sudden increase will be felt in the resistance to tightening of the ring 55. When such a clamping ring is subjected to an elevated temperature, the expansion of the tubular mounting body will cause the flange 57 to move away from the shoulder 58, reopening the gap 59 and maintaining a clamping force against the associated optical component.

We claim:

1. A mounting device for an optical component, comprising a hollow body having an internal shoulder against which an optical component bears in use of the device, and an annular clamping element in screw-threaded engagement with the body, wherein the improvement consists in the clamping element having at least one radially inwardly projecting integral deformable resilient lip which, upon assembly of an optical component in the device, bears against a surface of the optical component opposite that which bears against the shoulder to clamp said component resiliently against the said internal shoulder of the body.

2. The mounting device defined in claim 1, wherein the internal shoulder is annular and bears against a circumferentially continuous region of the optical component in use of the device, and wherein the clamping element has a single annular inwardly projecting deformable lip which upon assembly of the device exerts a circumferentially uniformly distributed clamping force on the optical component.

3. The mounting device defined in claim 1, wherein the clamping element has a number of circumferentially evenly distributed radially inwardly projecting deformable lips arranged around its internal periphery, which lips engage a said optical component at a number of evenly spaced apart positions upon assembly of the mounting device.

4. The mounting device defined in claim 2, wherein the annular lip of the clamping element has a number of circumferentially evenly distributed axially deformed portions which engage a said optical component at regularly spaced apart circumferential intervals in use of the device.

5. The mounting device defined in claim 1, wherein the said deformable lip is formed integrally with the remainder of the clamping element.

6. A mounting device for an optical component, comprising a hollow body having an internal shoulder against which an optical component bears in use of the device, and an annular clamping element in screw-threaded engagement with the body, wherein the improvement consists in the clamping element having at least one radially inwardly projecting integral deformable resilient lip which, upon assembly of an optical component in the device, bears against a surface of the optical component opposite that which bears against the shoulder to clamp said component resiliently against the said internal shoulder of the body, and wherein the said clamping element has a rigid substantially non-deformable part, the deformable lip overlying the said rigid part and being normally spaced from the latter by a gap which is closed when the clamping element is tightened on the body.

7. A mounting device for an optical component, comprising a hollow body having an internal shoulder against which an optical component bears in use of the device, and an annular clamping element in screw-threaded engagement with the body, wherein the improvement consists in the clamping element having at least one radially inwardly projecting integral deformable resilient lip which, upon assembly of an optical component in the device, bears against a surface of the optical component opposite that which bears against the shoulder to clamp said component resiliently against the said internal shoulder of the body, and wherein the internal shoulder is annular and bears against a circumferentially continuous region of the optical component in use of the device, said clamping element having a single annular inwardly projecting deformable lip which upon assembly of the device exerts a circumferentially uniformly distributed clamping force on the optical component.

* * * * *